United States Patent [19]
Berg et al.

[11] 3,994,240
[45] Nov. 30, 1976

[54] COIL CAR COVER

[75] Inventors: Robin L. Berg, Hudson, Wis.; Marvin A. Luger, Hugo; Neil C. Olsen, Edina, both of Minn.

[73] Assignee: Proform, Inc., Minneapolis, Minn.

[22] Filed: June 6, 1975

[21] Appl. No.: 584,625

[52] U.S. Cl. .............................. 105/377; 105/367; 220/1.5; 220/324; 292/133; 296/137 R
[51] Int. Cl.² .................................... B61D 39/00
[58] Field of Search ............ 105/367, 377; 296/100, 296/137 R; 292/125, 133, 225; 52/47, 53, 55; 220/1.5, 72, 323, 324; 150/.5, 52 R, 52 K; 206/508

[56] References Cited
UNITED STATES PATENTS

| 2,329,348 | 9/1943 | Honig | 292/125 |
|---|---|---|---|
| 2,977,900 | 4/1961 | Farrar | 105/377 |
| 3,327,649 | 6/1967 | Fisher et al. | 105/377 |
| 3,823,518 | 7/1974 | Allen | 52/53 |
| 3,857,601 | 12/1974 | Robbins | 296/100 X |

*Primary Examiner*—Robert G. Sheridan
*Assistant Examiner*—Randolph A. Reese
*Attorney, Agent, or Firm*—Merchant, Gould, Smith, Edell Welter & Schmidt

[57] ABSTRACT

A lightweight removable cover for railroad coil cars and the like, having a cover shell made of fiberglass reinforced plastic, with external reinforcing ribs having stacking brackets integrally formed therewith, thus permitting stacking of the covers when they are not in use on a car. A reinforcing box member around the bottom of the cover and extending outwardly from the shell cooperates with the external reinforcing ribs to protect from damage the handrails and other hardware attached to the outside of the shell. In a preferred embodiment, latches are provided for securing the cover to the car, and a centrally positioned lifting cage is connected to automatically release the latches when engaged by a lifting hook.

14 Claims, 9 Drawing Figures

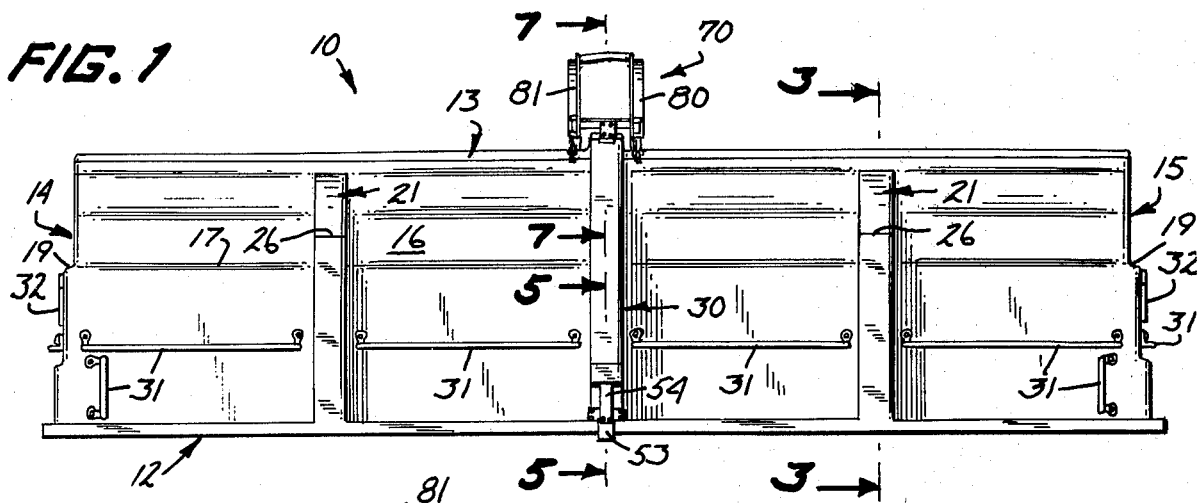
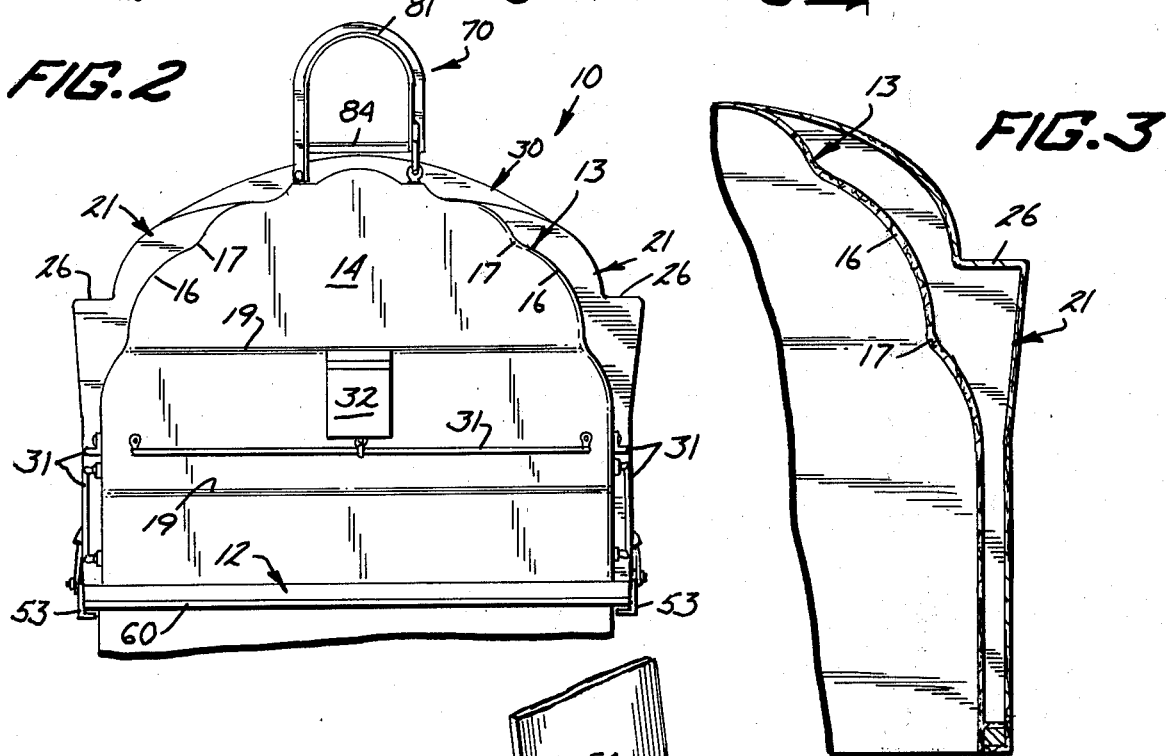
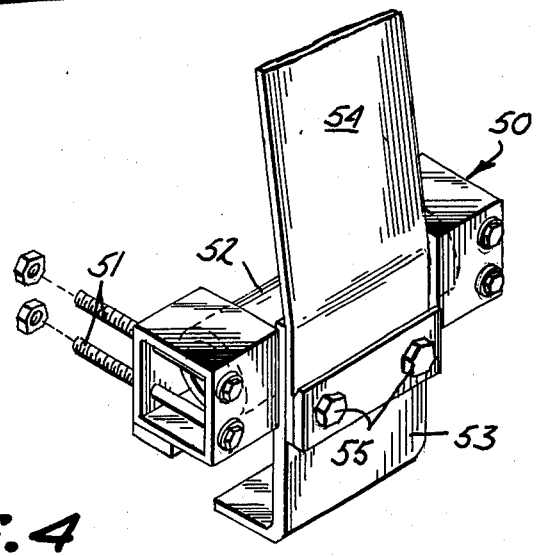

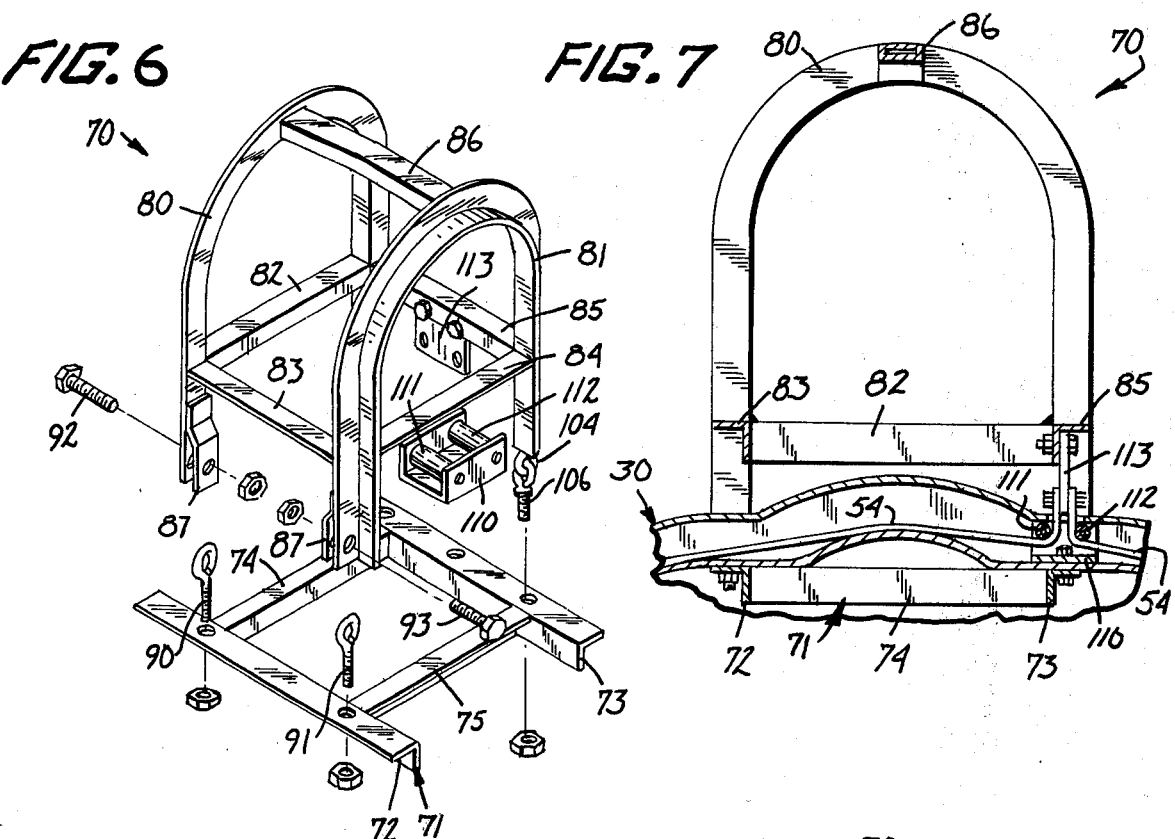
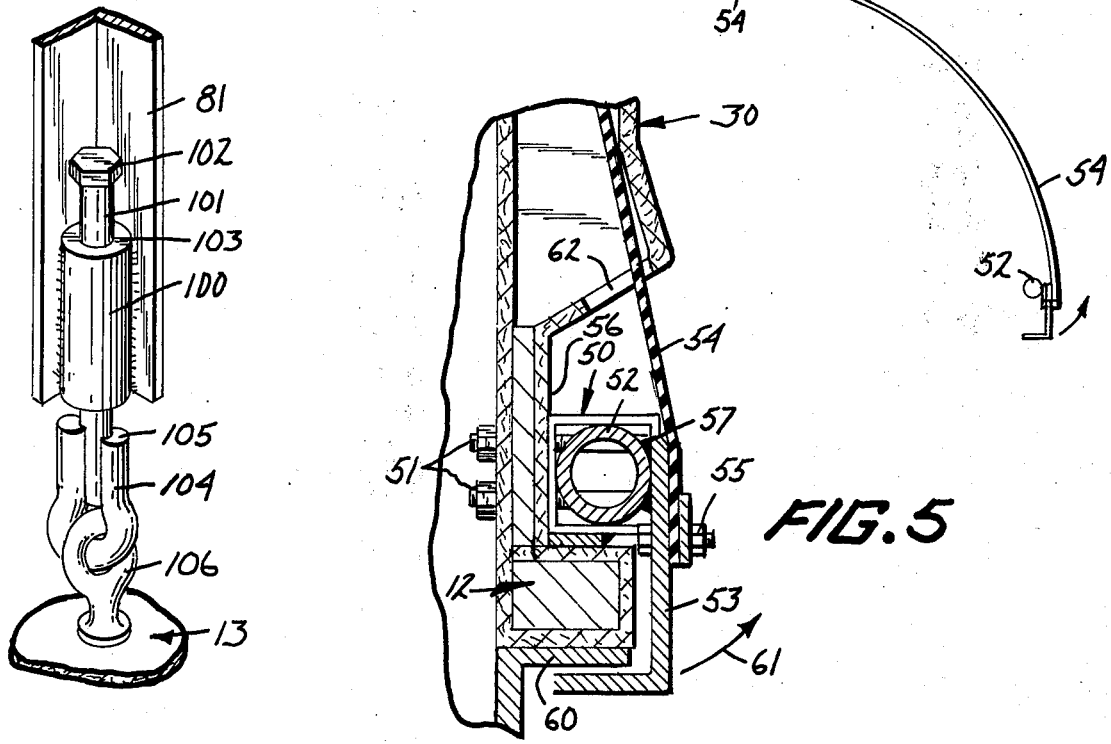

COIL CAR COVER

BACKGROUND OF THE INVENTION

The present invention pertains to removable weatherproof covers for railroad coil cars and the like.

In recent years it has become common for railroad companies to provide removable covers for certain types of otherwise open cars, in order to protect their cargo from the elements and to reduce damage claims. One example is a type of car known generally as a coil flat car, which is a special type of flat car having a shallow cradle and which is adapted for carrying large cylindrical coils of cable, sheet metal, aluminum and the like.

Covers for these cars have heretofore been made of steel, from large plates or sheets of sheet metal welded together with a few angle iron braces and beams to form the generally box shaped, open bottomed cover which is adapted to fit down over the coil car. A crane hook point is provided at the top, and a plurality of stacking shelves are often provided near the top for receiving the base of another cover, in stacked position.

The resulting prior art structure has proved to be less than satisfactory in a number of respects. For one thing, a single cover made of steel weighs approximately 3,000 pounds. Considering that two covers are generally required for each coil car, this represents three tons of deadweight per car, and represents a considerable extra expenditure of fuel for hauling this additional weight from point of origin to the destination.

A second disadvantage stems from the vulnerability of the steel covers to damage during handling by the lifting crane. The previously mentioned structure of sheet metal welded with angle iron reinforcing brackets is inherently subject to popping loose at the seams when a corner or side of the cover is bumped against another structure. This type of damage is encountered on a very frequent basis during lifting of the cover from a car, stacking one cover on another, and the reverse process. Also, the steel covers are inherently subject to rusting.

Another disadvantage of steel prior art covers is their poor thermal characteristics. Since steel is inherently a good thermal conductor, cool air in contact with the outside of the cover may cause condensation on the inside of the car and the cargo, leading to rusting both of the cover and the cargo. Insulation spray coatings have been applied on the insides of steel covers to solve this problem, but this additional process greatly increases the cost of the cover.

The present invention overcomes these and other problems existing with the present state of the art steel car covers. Car covers according to the present invention are made of fiberglass reinforced plastic (FRP). The resulting structure is almost as strong as steel, but weighs only about 1,500 pounds per cover. This results in a substantial savings in deadweight for the railroad, giving corresponding savings in fuel, greater available cargo load per car, and greater flexibility in balancing the load.

Covers according to the present invention are inherently more resistant to damage and breakage during normal handling than are the steel covers of the prior art. Fiberglass reinforced plastic is inherently more resilient in forgiving of bumps and rough handling, and will not dent or chip off paint and begin to rust. Since the main body of the cover is made as a single integral shell, there are no corner seams to split, leak or pop open if the cover is bumped or dropped on a corner.

Finally, since the FRP structure is inherently a better heat insulator than steel, the condensation problem referred to above is greatly alleviated in the present invention, without the necessity of additional expensive insulation coatings.

SUMMARY OF THE INVENTION

According to the invention there is provided a removable car cover which comprises the shell made of fiberglass reinforced plastic, including external reinforcement ribs formed therein. Stacking bracket surfaces are formed in the reinforcing ribs, so that a number of covers may be stacked one on top of another when not in use.

The ends of the cover shell may have one or more steps formed integrally therein, stepping inwardly from the bottom to the top of the structure, so that the covers are semi-nestable for stacking.

A reinforcing box member may be provided around the bottom of the shell, extending outwardly therefrom. The outwardly extending box member and the external reinforcing ribs cooperate to protect from damage handrails and other hardware which may be attached to the outside of the shell.

According to one preferred embodiment, a lifting member is connected to the shell at a central location on the upper part thereof. A pair of latches are provided along the base of the shell for engaging the top flange of a car to hold the cover in place. Latch linkage means are associated with the latch means and with the lifting member, and are operable to release the latch means when the lifting member is engaged by a crane or the like.

In a preferred embodiment, the latch linkage member comprises a reinforced rubber belt located in a housing within an external reinforcing rib, having one end connected to a portion of the lifting member, which is pivoted for limited rotation. The other end of the belt is attached to the latch.

BRIEF DESCRIPTION OF THE DRAWING

In the drawing,

FIG. 1 is a view in side elevation of a car cover according to the present invention;

FIG. 2 is a view in end elevation of the cover of FIG. 1;

FIG. 3 is a view taken generally along lines 3—3 of FIG. 1, portions thereof being broken away;

FIG. 4 is an exploded perspective of the latch means of the cover of FIG. 1;

FIG. 5 is a view taken generally along the line 5—5 of FIG. 1, showing the latch means;

FIG. 6 is an exploded perspective of the lifting cage assembly;

FIG. 7 is a view taken generally along lines 7—7 of FIG. 1;

FIG. 8 is a fragmentary detail in perspective of the lift cage limiter; and

FIG. 9 is a diagrammatic view of the latch linkage.

DESCRIPTION OF THE PREFERRED EMBODIMENT

In FIGS. 1 and 2, the car cover of the present invention is shown in side and end views respectively. The cover 10 comprises a shell made of fiberglass reinforced plastic. The shell has a generally rectangular base 12 which is adapted to fit onto the railroad car. Accordingly, the width of the cover is made according to the width of the car, but the length of the cover is generally only one half the length of the car, because it is more convenient in terms of handling and storage to have a pair of covers for one car.

The upper portion of the shell comprises a generally cylindrically curved or domed upper portion, generally designated by reference numeral 13, and end portions 14 and 15. A plurality of corrugations are integrally molded in the body shell, to provide necessary strength and rigidity. These corrugations comprise the generally alternating convex and concave surfaces 16 and 17, respectively, which are best seen in the end view in FIG. 2. One or more of the indentations, or concave portions 17, may extend from the sides of the car across the ends of the car, where they form step-like portions 19, best seen in FIGS. 1 and 2. Since the thickness of the shell itself is one eighth inch to three eighths inch in the preferred embodiment, the horizontally extending convex and concave portions 16 and 17, and stepped portions 19 provide a considerable degree of stiffness and rigidity to the structure.

Additionally, the base 12 of the shell preferably has a reinforced box shaped cross section member extending outwardly from the shell. The base 12 is formed integrally with or is attached to the bottom opening of the shell 13. For convenience during manufacturing, the box member can be initially formed from corrugated cardboard or wood or any other material, which serves merely as a spacer. Once the fiberglass reinforced plastic is formed around the spacer, the FRP provides the required strength. The box member thus serves to provide strength and rigidity to the cover, and additionally serves to help protect hardware mounted to the shell, as explained hereinafter.

External reinforcement ribs are provided for increasing the strength and rigidity of the cover. In FIG. 1, reference numeral 30 refers to the central reinforcement rib, and reference number 21 designates the other reinforcement ribs which are located between the center and the ends of the cover. External reinforcement ribs 21 are also shown in FIGS. 2 and 3. Both the central reinforcement rib 30 and the other reinforcement ribs 21 protrude significantly from the side of the shell, as seen in FIG. 2. In the preferred embodiment, the reinforcement ribs are separately formed with a generally U-shaped cross section, and are then bonded to the shell during the fabrication thereof.

As shown in FIGS. 1, 2 and 3, a stacking bracket 26 is formed in the reinforcement rib 21 to facilitate multiple stacking of the cover units when not in use on a car, or while the car is being loaded. As best seen in FIG. 2, the stacking brackets 26 extend to a width slightly wider than the width of the base of the cover. The base 12 of one cover may then rest on the stacking brackets 26 of another cover, whereby a plurality of units can be nested together, with the upper portion of one cover extending into the empty interior of another.

As shown in FIGS. 1 and 2, a central rib 30 extends in arch fashion from the base 12 on one side of the car, completely over the top of the cover and down to the base on the other side. In addition to serving as an external reinforcement rib, central rib 30 also serves as a housing for the latch linkage, explained hereinafter.

A plurality of handrails 31 are provided along the sides and ends of the car cover as shown in FIGS. 1 and 2. These rails can be mounted by means of bolts and washers drilled through holes in the shell. Federal safety regulations require a minimum clearance of 2½ inches between the inside face of the handrail and the cover. If the handrail is depressed inward by rough handling, repairs are required.

It will be appreciated that all mounting hardware, including handrails 31, is protected from damage by virtue of the fact that ribs 21 and box member 12 which forms the base extend outwardly from the sides of the shell to form protected areas inbetween in which the rails are placed. The end corrugations or step-like portions 19 also serve to protect hardware. Thus, during stacking, loading and unloading, the reinforcement ribs and the box member on the base are more likely to take bumps and blows, rather than the rails which might otherwise be broken or knocked loose.

At the ends of the cover, an inspection door is provided which may comprise a FRP flap 32 attached by a rubber hinge over an opening. This allows railroad workers to view the contents of the car, when necessary.

Because the car cover according to the present invention is so lightweight, although it is substantially as strong as a steel cover, latches are provided along the sides of the cover for attaching it to the car so that it will not be blown off by high wind gusts or knocked off by bumps or extensive vibration. In addition, a latch linkage member is provided between the latches and the lifting member on the top of the cover so that the latches are automatically released when a crane hook engages the lifting member.

The latch member is shown in FIG. 4. A mounting bracket 50 is adapted to be attached to the side of the cover shell, by means of bolts 51. The mounting bracket comprises two spaced apart members, which in the embodiment shown, are square in cross section. The opening in the mounting brackets receive a pivot pipe 52. An L-shaped angle member comprises the latch, 53, which is welded to the pivot 52. The latch linkage in the preferred embodiment is a reinforced rubber belt 54, which is attached to latch 53 by any suitable means, such as bolts 55.

FIG. 5 shows the mounting of the latch to the cover shell, in cross section. Bolts 51 and their mating nuts connect through holes drilled in the cover shell 13, and also through the extreme lower portion 56 of the housing 30. The mounting brackets 50 are preferably positioned just above the box member of base 12 of the cover.

The spot welds 57 which attach latch 53 to the pivot pipe 52 are shown in FIG. 5. The base 12 of the cover rests upon a top flange 60 of the railroad car, and the L-shaped hook end of latch 53 pivots in response to gravity into the position shown in FIG. 5, beneath the flange 60. Thus, the latch holds the cover securely on the car.

To release the latch, a tension is applied to belt 54 which causes the latch to pivot outward away from flange 60, as indicated by arrow 61. The belt 54 extends through an opening 62 in the central rib 30 and therethrough up towards the top of the cover.

A lifting cage assembly 70 is provided at the top of the car. As best shown in FIGS. 6 and 7, the lifting cage comprises a cage mounting frame 71, which comprises a pair of angle brackets 72, 73, and a pair of cross braces 74, 75. The cage mounting frame 71 is mounted beneath shell 13, as seen in FIG. 7, and serves as an anchor point for the upper portion of the cage assembly. The upper portion of the cage assembly comprises a pair of U-shaped cage members 80 and 81, which are interconnected by four braces 82-85. A lifting bar 86 is welded between the tops of the U-shaped cage members 80 and 81, and serves as a lifting point for a crane hook. Although U-shaped members are shown, the shape is not critical and any convenient shape may be used.

The bottoms of cage members 80, 81 on one side have auxiliary brackets 87 and are bored to define a pivot axis. Eye bolts 90, 91 have their threaded ends extending through the shell 13 and angle member 72, where they are engaged by nuts. The eyes of bolts 90 and 92 fit in the spaced defined between the ends of members 80, 81 and the auxiliary brackets 87. Pivot bolts 92 and 93 pass through member 80, eye bolt 90 and through member 81 and eye bolt 91, as indicated in FIG. 6. The ends of bolts 92 and 93 are secured with nuts, but the lifting cage 70 is free to pivot about the pivot axis which is colinear with bolts 92 and 93.

The other legs of members 80 and 81 also connect to eye bolts which in turn connect through the shell to the cage mounting frame. However, as shown in FIG. 8, a lift cage limiting device is provided so that the lifting cage will pivot only a predetermined amount during the lifting process. In FIG. 8, a tube 100 is seen welded to the inside of the bottom of cage member 81. A bolt 101 is slideably disposed within tube 100. The bolt 101 has a head 102 at one end which engages the end surface 103 of tube 100 to limit the pivoting of the lifting cage. The other end of bolt 101 has welded thereto an eye member 104. The upper surfaces 105 of the eye member contact the bottom surface of tube 100 when the lifting cage is in its unpivoted, at rest position. The eye of eye bolt 106 passes through eye member 104, and its threaded end extends through the shell 13, and is bolted to angle member 73 of the cage mounting frame. A similar lift cage limiter connects the other end of member 80 to the cage mounting frame.

U-shaped cage members 80 and 81 essentially straddle the top portion of central rib 30 where it arches over the top of shell 13. This can be seen in both FIGS. 1 and FIG. 7. A U-shaped bracket 110, having a pair of rollers 111 and 112 is placed between shell 13 and rib 30, as indicated in FIGS. 6 and 7. A belt mounting plate 113 is connected to brace 85, midway between members 80 and 81. The flexible rubber belts 54, from the right and left hand sides of the cover are routed within the enclosure defined by rib 30, between it and shell 13. Near the lifting cage, the belts pass around and between rollers 111 and 112, respectively, and are attached to belt mounting plate 113, by any suitable means, for example the bolts and attachment plates shown.

Reference is made to FIG. 9 which diagrammatically shows the operation of the release mechanism. When the cover is to be lifted from a car, a crane hook engages the lifting bar 86 of the lifting cage 70 and begins to apply a lifting force thereto. The initial movement results in cage 70 pivoting about the pivot axis defined by bolts 93 and 92 (FIG. 6). This movement exerts a tension on belts 54, which cause latch 53 to pivot about its pivot point 52, and swing outward as indicated by arrows 61. Continued pivoting motion of lifting cage 70 results in engagement of surface 103 of the tube 100 (of FIG. 8) with the head 102 of bolt 101. Thereafter, further lifting force applied by the crane results in even application of force from all four legs of the lifting cage to the cover, so that the cover can be lifted off.

Upon reinstalling the cover on a car, it is first lowered into position so that the base 12 rests upon the flange 60 of the car. As the hook is lowered even more, lifting cage 70 pivots back towards it at rest position, releasing the tension of belts 54. The force of gravity then allows the latch 53 to fall back in place engaging the flange 60 of the car.

In manufacturing the cover according to the present invention, standard fabrication methods are used for FRP contact molding. A mold having the shape and dimension of the inside of the shell is first prepared. This mold will have a generally corrugated surface corresponding to the horizontal reinforcement corrugations and steps which are to be formed in the cover.

In fabrication, layers of fiberglass woven roving are applied by hand and filaments of fiberglass continuous roving and polyester thermosetting resin are added by a spray gun until the design thickness is achieved. A polyester gel coat is added to the exterior surface to provide a permanent weathering surface and color. The final laminate is composed of approximately 35 percent fiberglass reinforcing and 65 percent polyester resin. After the cover has cured, it is removed from the mold, and the necessary holes are drilled therein for mounting the handrails, latches, and lifting cage, as previously indicated.

Thus we have provided an improved lightweight removable car cover, made of fiberglass reinforced plastic with external reinforcing ribs. All hardware is recessed for protection between the reinforcing ribs and the reinforcing box member around the base. Latches may be provided which are automatically releasable from a single point by the lifting crane, so that no manual operations are required to release the latches. The resulting structure is more durable and weatherproof than prior art covers.

We claim:

1. A removable cover for a railroad car comprising a fiberglass reinforced plastic cover shell including a domed top and side and end walls stepped inwardly from the bottom up, a plurality of hollow reinforcing ribs attached externally to said shell to extend outwardly therebeyond, and stacking brackets formed integrally with said external reinforcing ribs, whereby covers may be stacked one on top of another for storage.

2. A removable car cover according to claim 1 together with a latch actuator traversing at least one of said hollow ribs.

3. A removable car cover according to claim 1 wherein said cover shell includes a box member integral therewith along the bottom of said cover shell and extending outwardly therefrom, and further including handrails attached to the sides of said plastic shell, said box member and said external reinforcing ribs extending far enough outwardly from said cover shell to protect said handrails from damage.

4. A removable car cover, comprising:
   a. a fiberglass reinforced plastic shell having a base for fitting on a car and having an upper portion;
   b. said shell including hollow reinforcement ribs;
   c. a lifting member connected centrally of said upper portion of said shell;

d. latch means connected to said shell along the base thereof for attaching said cover to a car;
e. means associated with said lifting member and said latch means and traversing one of said hollow ribs for causing said latch means to unlatch from the car when a lifting force is applied to said lifting member.

5. A removable car cover, comprising:
a. a fiberglass reinforced plastic shell having a base for fitting on a car and having an upper portion;
b. said shell including reinforcement ribs therein;
c. a lifting member connected centrally of said upper portion of said shell;
d. latch means connected to said shell along the base thereof for attaching said cover to a car; e. means associated with said lifting member and said latch means for causing said latch means to unlatch from the car when a lifting force is applied to said lifting member, wherein said lifting member comprises a lifting cage attached to said shell and adapted to receive a lifting hook, and said lifting cage is pivotally mounted for limited pivotal movement when a lifting force is applied thereto.

6. Apparatus according to claim 5 wherein said means for causing said latch means to unlatch is responsive to said limited pivotal movement of said lifting cage.

7. Apparatus according to claim 6 wherein said means for causing said latch means to unlatch includes a flexible tension transmitting member connected between said lifting cage and said latch means.

8. Apparatus according to claim 7 wherein said tension transmitting member comprises a rubber belt.

9. A removable car cover comprising:
a. a fiberglass reinforced plastic shell having a base for fitting on a car and having an upper portion;
b. said shell including reinforcing ribs having a stacking bracket formed therein;
c. a lifting member attached centrally of the upper portion of said shell, said lifting member attachment adapted to allow limited movement when a lifting force is applied;
d. latch means connected to said shell near the base thereof for attaching said cover to a car;
e. an elongated housing attached to said shell extending from near said lifting member to near said latch means; and
f. a latch linkage member disposed in said housing and connected to said lifting member and said latch means for causing said latch means to unlatch when the cover is lifted from said lifting member.

10. Apparatus according to claim 9 wherein said lifting member is attached for limited pivotal movement.

11. Apparatus according to claim 10 wherein said latch linkage member comprises a rubber belt connected to said lifting member and to said latch means.

12. Apparatus according to claim 9 wherein said latch means comprises L-shaped member pivotally mounted to said shell and adapted to engage a flange on a car.

13. Apparatus according to claim 9 wherein said reinforcing ribs include vents communicating internally and externally of said shell.

14. A removable cover for a railroad car comprising a fiberglass reinforced plastic cover shell including a domed top and side and end walls stepped inwardly from the bottom up, a box member integral with said shell along the bottom thereof and extending outwardly therefrom, a plurality of hollow reinforcing ribs attached externally to said shell to extend outwardly therebeyond, and stacking brackets formed integrally with said external reinforcing ribs, whereby covers may be stacked one on top of another for storage.

* * * * *

Disclaimer 3,994,240.—*Robin L. Berg*, Hudson, Wis., and *Marvin A. Luger*, Hugo, and *Neil C. Olsen*, Edina, Minn. COIL CAR COVER. Patent dated Nov. 20, 1976. Disclaimer filed Feb. 14, 1977, by the assignee, *Proform, Inc.*
Hereby enters this disclaimer to claim 13 of said patent.
[*Official Gazette March 29, 1977.*]